United States Patent [19]

Maeda et al.

[11] 4,203,669
[45] May 20, 1980

[54] WAVELENGTH READING APPARATUS FOR MONOCHROMATOR

[75] Inventors: Yoshio Maeda; Koichi Matsumoto; Koji Nishiwaki, all of Katsuta, Japan

[73] Assignee: Hitachi, Ltd., Tokyo, Japan

[21] Appl. No.: 37,033

[22] Filed: May 8, 1979

Related U.S. Application Data

[63] Continuation of Ser. No. 734,306, Oct. 20, 1976, abandoned.

[30] Foreign Application Priority Data

Oct. 23, 1975 [JP] Japan ............... 50-126906

[51] Int. Cl.² ............................................. G01J 3/12
[52] U.S. Cl. ........................... 356/332; 356/334; 250/231 SE
[58] Field of Search ............ 356/326, 328, 332, 333, 356/334; 250/231 SE

[56] References Cited

U.S. PATENT DOCUMENTS

| | | | |
|---|---|---|---|
| 3,563,656 | 2/1971 | Helms | 356/334 |
| 3,770,971 | 11/1973 | Somerset | 250/231 SE |
| 3,794,425 | 2/1974 | Smith et al. | 356/330 |
| 3,868,499 | 2/1975 | Aaronson | 356/334 |
| 4,037,970 | 7/1977 | Webster et al. | 356/418 |

OTHER PUBLICATIONS

"Programmable Monochromator . . . ", Cordos et al., Anal. Chem., vol. 45, #2, Feb. 1973, pp. 425–433.

*Primary Examiner*—Vincent P. McGraw
*Attorney, Agent, or Firm*—Craig and Antonelli

[57] ABSTRACT

A wavelength reading apparatus for a monochromator comprises a monochromator utilizing a dispersion element for dispersing light in accordance with its wavelengths, a dispersion element driver unit for rotating the dispersion element to effect the tuning wavelength scanning operation of the monochromator and a wavelength counter for adding or subtracting a pulse, which is produced each time when the tuning wavelength of the monochromator changes by a predetermined wavelength increment, depending on whether the wavelength increases or decreases. The wavelength counter is set to a predetermined counting value, in response to a wavelength calibrating pulse produced when the tuning wavelength of the monochromator reaches a predetermined value, so that any counting value of the wavelength counter correctly represents the instant value of the tuning wavelength of the monochromator.

11 Claims, 12 Drawing Figures

WAVELENGTH READING APPARATUS FOR MONOCHROMATOR

This is a continuation of application Ser. No. 734,306, filed Oct. 20, 1976, and now abandoned.

BACKGROUND OF THE INVENTION

1. Field of the Invention

The present invention relates to a wavelength reading apparatus for use in dispersive type monochromators and more particularly, it relates to a monochromator wavelength reading apparatus incorporated with a wavelength counter which is linked with a dispersion element driver unit to read and indicated digitally tuning wavelengths of the monochromator and which is convenient for automatically calibrating read-out values to indicate correct wavelengths.

2. Description of the Prior Art

Conventionally, it has been usual to indicate the tuning wavelength of a monochromator by means of a graduated disc or a mechanical counter mechanically linked with a dispersion element driver unit which is provided to rotate a dispersion element such as a diffraction-grating or a prism. With the tuning wavelength indication of the graduated disc type, however, since the tuning wavelength indicator is mechanically linked with the dispersion element driver unit, the relative position between them is mechanically fixed and in the event of erroneous indications of the indicator, troublesome adjustment for calibration of the tuning wavelength indications are needed. Also, the mechanical counter whose operation speed is limited because of its mechanical structure restricts the increase of the wavelength scanning speed of the monochromator. In addition, those conventional tuning wavelength indicators are usually applicable to a mere indication of the tuning wavelengths of the monochromator and it is very difficult to use them for producing a signal indicative of the tuning wavelength which may be utilized for other apparatus. On the other hand, the digital process technique is becoming popular today and there is a requirement for converting the tuning wavelengths of the monochromator into electrical signals in order, for example, to process the waveform indicative of spectra obtained from a sample analysis utilizing a monochromator, or to apply the spectra obtained from a monochromator to arithmetic operation by a minicomputer which is connected on line to the monochromator. Further, by converting the tuning wavelengths of the monochromator into electrical signals, these electrical signals can be used as wavelength-axis sweep signals of a recorder for recording spectra; as, in the course of the wavelength scanning operation, and used for calibration of wavelength indications, which is carried out at a predetermined wavelength. Further, by using those electrical signals the interchange of light sources, diffraction gratings or detectors and the insertion of a filter into the light path can be effected accurately and automatically.

Because of such advantages as above, in place of the aforementioned graduated disc and mechanical count indicator, one type of wavelength signal generator wherein a potentiometer is linked with the dispersion element driver unit such that a voltage output corresponding to the tuning wavelength of the monochromator is derived out of the potentiometer or another type wherein an encoder is linked with the wavelength driver unit such that a digital output corresponding to the tuning wavelength is derived out of the encoder has been proposed.

These conventional measures, however, are disadvantageous in some aspects. In the first place, with an analog wavelength signal generator utilizing a potentiometer or the like, accuracy and linearity are degraded. For example, in spite of the fact that an accuracy of $4 \times 10^{-5}$ is required for converting a wavelength lying in the range of 2500 nm covering ultraviolet, visible and near infrared regions into an electrical signal with an accuracy of 0.1 nm, the potentiometer can provide at the most an accuracy of several to several tens when applied to the wavelength range of 2500 nm. On the other hand, by using two or three digital encoders each having 2 to 3 digits combined with each other through gears, a wavelength count indicator can easily be realized which has much higher accuracy than the analog type indicator. However, the encoder is very expensive and the indicator incorporated with 2 or 3 encoders in combination suffers from a drastically high cost.

In the second place, in case of a monochromator of the type in which two or more diffraction-gratings having different wavelength ranges are used interchangeably in order to provide a wide wavelength range to be scanned, troublesome calculations are required for converting wavelength signal outputs into tuning wavelengths of the monochromator when the diffraction-gratings are changed.

In the third place, a complicated device for the wavelength calibration of the monochromator is required. If the tuning wavelength of the monochromator deviates from the indicated wavelength obtained from the output signal of the wavelength signal generator, which deviation would stem from wear or plays occurring in a rotation mechanism provided in the wavelength driver unit to rotate the dispersion element and a linking mechanism between the wavelength driver unit and the wavelength signal generator, those deviations should be immediately corrected. For correction of such deviations, a wavelength deviation is measured by using a light source having known line spectra and a quantity corresponding to the wavelength deviation is added to or substracted from the output signal of the wavelength signal generator. This requires a special operational or calculation unit.

SUMMARY OF THE INVENTION

The present invention is aimed at eliminating the aforementioned disadvantages of the prior art apparatus, and has an object to provide a wavelength reading apparatus for a monochromator which is capable of deriving digital signals indicative of tuning wavelengths of the monochromator with ease and high accuracy, and capable of easily calibrating deviations of indicated wavelengths represented by digital signals from actual wavelengths.

A wavelength reading apparatus according to the invention is provided to comprise an optical system having a dispersion element rotatably mounted, of which the tuning wavelength varies in accordance with the variation of its angular position in rotation, a driver unit for rotating the dispersion element, a wavelength counting pulse generator for producing wavelength counting pulses, each being produced with every variation of the rotation angular position of the dispersion element corresponding to a predetermined increment in the variation of the tuning wavelength of the dispersion element, a counter for adding to or subtracting from a set value thereof the pulses produced from the wavelength counting pulse generator depending on the rotational direction of the dispersion element, means for producing a calibrating pulse in response to a predetermined angular position of the dispersion element, and means for setting the counter to a predetermined value in response to the calibrating pulse, the predetermined value corresponding to the tuning wavelength of the dispersion element when it is located at the predetermined angular position.

DESCRIPTION OF THE PREFERRED EMBODIMENTS

Figure 1:
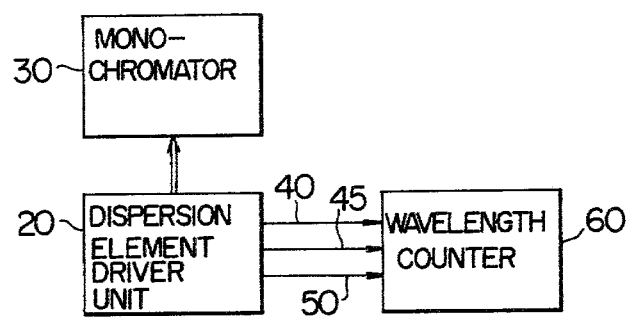
FIG. 1 is a block diagram showing a basic construction of a wavelength reading apparatus for the monochromator of the invention.

Referring now to FIG. 1 which shows a block diagram illusrative of the principle of the present invention, there is shown a dispersion element driver unit 20 including, for example, a drive motor, a gear train and a sine bar unit. The dispersion element driver unit 20 transmits a rotary movement to a dispersion element such as a diffraction-grating to change the tuning wavelength of a monochromator 30. A wavelength counter 60, which may be a pulse counter, executes, an additive counting or a subtractive counting, depending on whether a direction signal 45 indicates an increase or decrease of the tuning wavelength, as to pulse signals 40 which are produced by the dispersion element driver unit 20 at every change of the tuning wavelength by a predetermined wavelength increment Δλ, so that the count of the wavelength counter 60 follows correctly the change of the tuning wavelength of the monochromator 30. Further, the wavelength counter 60 is set to a value corresponding to a predetermined wavelength $\lambda_c$ in response to a wavelength calibrating pulse signal 50 which is produced from the dispersion element driver unit 20 when the dispersion element is moved to a position where it derives the tuning wavelength $\lambda_c$, whereby the wavelength counter is calibrated to indicate a count corresponding to a tuning wavelength of the monochromator. By producing the wavelength counting pulse signals 40 with every change of the tuning wavelength by a smaller wavelength increment, it is possible to cause the wavelength counter 60 to indicate the tuning wavelength of the monochromator with higher accuracy. Obviously, the wavelength calibrating pulse signal 50 should be produced with the same order of accuracy as that of the wavelength increment Δλ.

Figure 2:
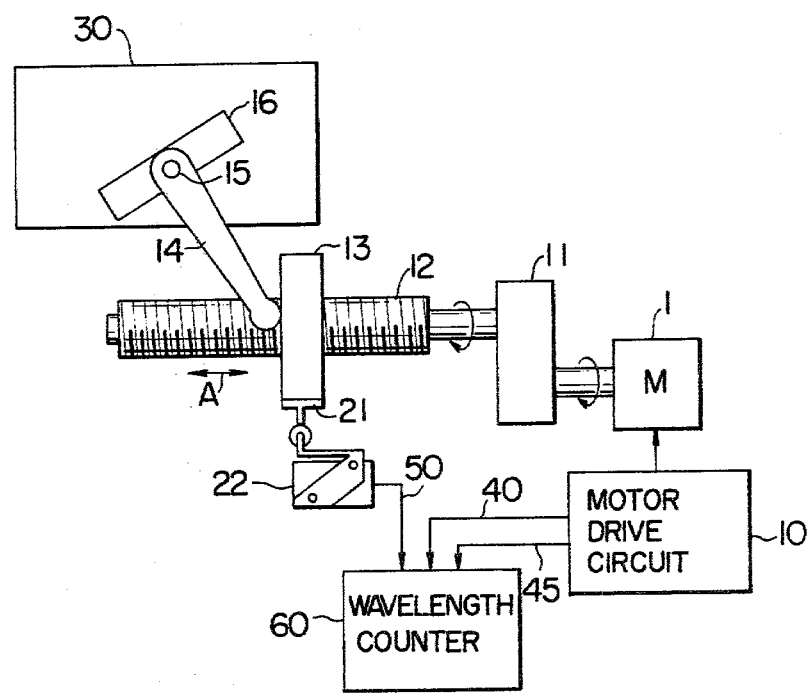
FIG. 2 is a diagram schematically showing one embodiment of the invention.

A wavelength reading apparatus as exemplified in FIG. 2 comprises a dispersion element driver unit having a motor drive circuit 10, a motor 1, a gear train 11, a feed screw 12, a slider 13 and a lever 14. It will be appreciated that the dispersion element driver unit herein disclosed is basically similar to a conventional sine bar type dispersion element driver unit. The motor drive circuit 10 drives the motor 1 which in turn transmits its rotation via the gear train 11 to the feed screw 12 thereby to rotate the same. The slider 13 travels in the direction of arrow A, to the right or to the left. The monochromator 30 includes a diffraction-grating 16 which is pivoted at a shaft 15 to rotate as the slider 13 travels. The operation wavelength or tuning wavelength of the monochromator is determined by the angular position, in rotation, of the diffraction-grating 16 which in turn is determined by the position, in transverse movement, of the slider 13. In the case of the sine bar type dispersion element driver unit, the amount of angular movement of the feed screw 12 is proportional to the amount of variation of the tuning wavelength. Accordingly, rotation of the feed screw 12 varies proportionally to the tuning wavelength of the monochromator thereby to perform the wavelength scanning operation of the monochromator. To indicate the instant tuning wavelength of the monochromator, a signal representative of the transverse position of the slider 13 or the rotating angle of the feed screw 12 can be utilized. The prior art apparatus was arranged to indicate the tuning wavelength represented by the rotating angle of the feed screw 12 by using a graduated disc or a mechanical counter mechanically linked with the gear train 11, or, alternatively, by deriving an electrical signal indicative of the tuning wavelength from an encoder or a potentiometer linked with the gear train.

According to the present invention, however, the slider 13 is provided with a pawl 21 which actuates a switch 22 when the tuning wavelength λ of the monochrometer reaches a predetermined value $\lambda_c$ or a travel x of the slider 13 is $x=x_c$. An actuation signal of the switch 22 is fed as a wavelength calibrating pulse signal 50 to the wavelength counter 60 to set its count to a fixed value corresponding to the wavelength $\lambda_c$. Also, the wavelength counter 60 carries out addition or subtraction of a wavelength counting pulse signal 40 delivered from the motor drive circuit 10 in a manner to be described later. The motor drive circuit 10 controls the rotation of the motor 1 and produces a single wavelength counting pulse 40 in every rotational movement of the motor 1 by a predetermined rotating angle which corresponds to the rotating angle of the feed screw 12 required to vary the tuning wavelength of the monochrometer 30 by a predetermined wavelength increment Δλ. For example, when a pulse motor is used as motor 1 and driven by driving pulses delivered from the motor drive circuit 10, those driving pulses or pulses proportional thereto are used as wavelength counting pulses 40. Depending on whether the motor 1 rotates in forward a backward direction, the wavelength counting pulses 40 are added to or subtracted from a count of the wavelength counter 60. Accordingly, the fixed count corresponding to the predetermined wavelength $\lambda_c$, which has been preset in the wavelength counter 60, changes according to addition thereto or subtraction therefrom of a count corresponding to variation of the tuning wavelength with the result that the counting value of the wavelength counter 60 always correctly represents the instant tuning wavelength of the monochromator.

Figure 3:
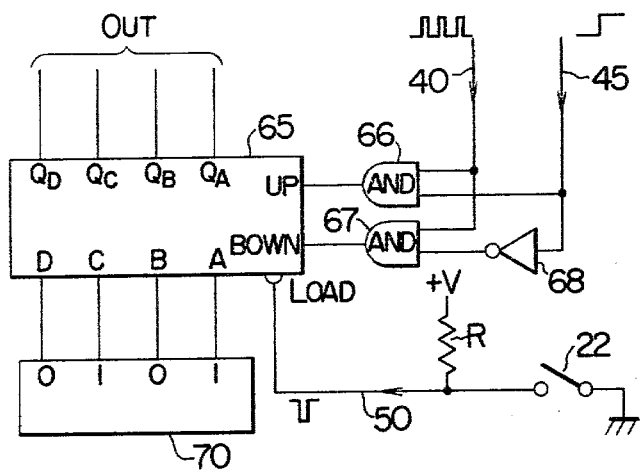
FIG. 3 is a circuit diagram of a wavelength counter incorporated in the embodiment of FIG. 2.

FIG. 3 shows an example of the wavelength counter 60 arranged in a digital circuit which includes a binary reversible counter 65 such as a counter of type SN 74193 made by Texas Instruments Inc. in U.S.A., two AND gates 66 and 67, and an inverter 68. A direction signal 45 bears a logic "1" to open the AND gate 66 when the motor 1 runs forwardly, while it bears a logic "0" when the motor 1 runs backwardly to close the gate 66. The logic "1" or "0" is simultaneously applied to the inverter 68 to be inverted to logic "0" or "1" which close or open the AND gate 67. A train of the wavelength counting pulses 40 are applied to a terminal UP or a terminal DOWN of the binary reversible counter 65 dependent on which of the AND gates 66 and 67 is opened, to increase or decrease the count of the binary reversible counter 65 by a number of the counting pulses. The count of the binary reversible counter 65 is read out in the form of a binary code from output terminals $Q_A$, $Q_B$, $Q_C$ and $Q_D$. On the other hand, a terminal LOAD of the binary reversible counter is normally maintained at a logic "1" by a source of +V volts connected thereto via a resistor R. However, when the tuning wavelength of the monochromator takes a value $\lambda_c$, as abovementioned, and the switch 22 is closed, the terminal LOAD is connected to the ground potential to assume logic "0" which causes the count of the binary reversible counter 65 to be set to a predetermined value which has previously been set in a count setting unit 70 and applied thereto via setting terminals A, B, C and D. For example, in the case where the count setting unit 70 has previously been set such that terminals A and C and terminals B and D receive "1" and "0", respectively, the binary reversible counter 65 is set to a binary number 0101 or a decimal number 5 in every event of closure of the switch 22. While the description has been given by way of a binary-four digit count, any desired number of binary digits can be readily accomplished in the connecting binary reversible counters 65 by increasing the stages.

Figure 4A:
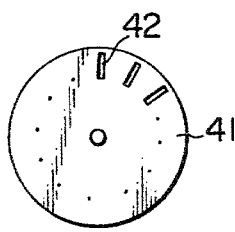
FIGS. 4a and 4b show one example of a wavelength spacing pulse signal generator.
Figure 4B:
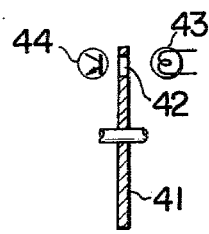

As will be understood from the foregoing description, the wavelength counter 60 always indicate a count corresponding to the tuning wavelength λ of the monochromator. Further, since the count of the wavelength counter 60 is automatically calibrated in response to the wavelength calibrating pulse signal 50 produced upon actuation of the switch 22 when the monochromator is conditioned to provide the tuning wavelength $\lambda_c$, it is possible to automatically correct a false count of the wavelength counter 60 which may occur due to some accident such as where, for example, the pulse motor fails to follow the pulses from the motor drive circuit 10. When the motor 1 is other than a pulse motor, the direct delivery of the wavelength counting pulse signal 40 from the motor drive circuit 10 may be difficult. Alternatively, for generation of the wavelength counting pulse signal, a wavelength counting pulse signal generator is mechanically linked with the feed screw 12 or the gear train 11. Such a wavelength counting pulse signal generator may be realized, for example, by using a slit disc 41 which is made from a disc formed therein with equally angularly spaced slits 42 as shown in FIG. 4a and mechanically linked with the feed screw 12 or the gear train 11 to rotate in synchronism with rotation of the feed screw, a light source 43, and a photoelectric element 44. The light source and the photoelectric element are arranged, as shown in FIG. 4b, so that the photoelectric element 44 produces a pulse in response to the light incident thereto from the light source 43 when one of the slits 42 passes between the light source and the photoelectric element.

Figure 5A:
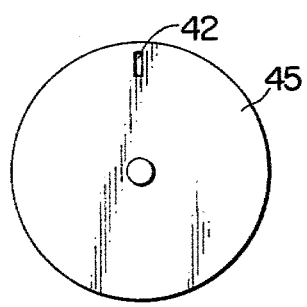
FIGS. 5a and 5b show one example of a wavelength calibrating pulse signal generator.
Figure 5B:
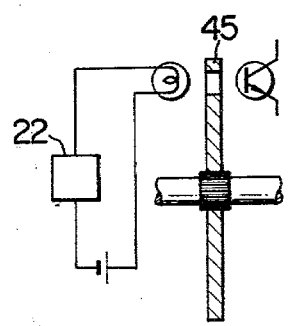

In a similar manner, the wavelength calibrating signal may be produced. More particularly, a slit disc 45 made from a disc formed therein with a single slit 42 as shown in FIG. 5a is linked with the feed screw or the gear train to rotate in synchronism with rotation of the feed screw and the slit disc 45 is cooperatively associated with a light source 43 and a photoelectric element 44 as shown in FIG. 5b. It will be seen that a pulse signal is produced with this arrangement when during rotation of the feed screw the slit 42 comes to a predetermined angular position aligned with the light source and the photoelectric element and simultaneously the light source is energized. Obviously, the light source 43 is turned on by closing the switch 22 of FIG. 2 and therefore, the closure of the switch 22 in addition to the alignment of the slit 42 at the predetermined angular position causes the generation of a pulse signal which is used as a calibrating pulse signal. Generally speaking, the mechanical switch 22 tends to have a relatively wide operation range where the switch actuates by engagement with the pawl 21, while the slit of the disc is capable of permitting the light of the light source to reach the photoelectric element substantially only when the slit comes precisely to the predetermined angular position. Therefore, the pulse signal is produced when the slider exists in an area corresponding to the operation range of the mechanical switch and simultaneously the slit comes to the predetermined angular position corresponding to the slider position where the monochromator provides precisely the tuning wavelength $\lambda_c$. The disc is preferably arranged to make one revolution during one revolution of the feed screw 12. Thus, it is possible to produce the wavelength calibrating pulse accurately in compliance with the intended tuning wavelength $\lambda_c$.

Figure 6:
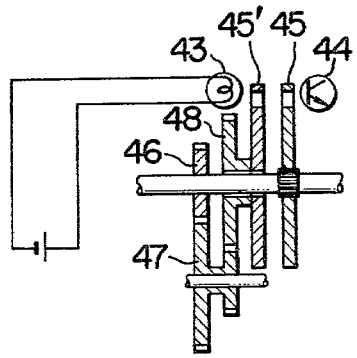
FIG. 6 shows another example of wavelength calibrating pulse signal generator.

Alternatively, an arrangement as shown in FIG. 6 dispensing with the switch 22 may be employed wherein there are provided two discs 45 and 45', each having one slot, and the disc 45 is directly linked with the feed screw or the gear train and the other disc 45' is linked with the feed screw through a reduction gear train of reduction ratio of 1:N including gears 46, 47 and 48 such that while the former disc 45 makes N revolutions the latter disc 45 makes one revolution. With this arrangement, the photoelectric element 44 produces a pulse once for N revolutions of the feed screw when the light source 43, photoelectric element 44 and the two slits are aligned. The pulse thus produced can be utilized for calibrating the wavelength. Necessarily, the number N of revolution is so determined as to produce the wavelength calibrating pulse once when the monochromator scans its whole wavelength range. The disc 45 is employed because only the disc 45' of reduced speed fails to produce a pulse signal having a narrow pulse width and a sharp rising edge, preventing a highly accurate generation of the wavelength calibrating pulse signal. The use of the disc 45 in combination ensure the generation of a highly accurate wavelength calibrating pulse signal.

Figure 7:
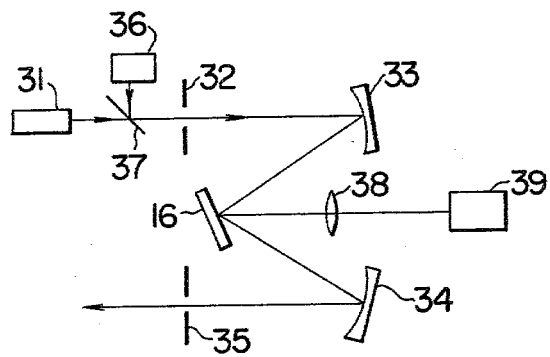
FIG. 7 is a schematic diagram of still another example of a wavelength calibrating pulse signal generator.

Through the calibration by using a wavelength calibrating signal generator linked with the feed screw 12 or the gear train 11, a calibration for a wavelength shift, mainly due to such an accident of the optical system of the monochromator as a shift of the angle position of the diffraction-grating 16 relative to the lever 14, cannot be accomplished. In order to conduct a wavelength calibration covering an occurrence as above, it is preferable to set the wavelength counter 60 following, for example, a correct tuning adjustment for the diffraction-grating 16 through the use of a calibrating light source which emits a known line spectrum. This tuning adjustment can automatically be accomplished by an arrangement as shown in FIG. 7, for example, such that in addition to a monochromator including a measuring light source 31, an incident slit 32, a reflection mirror 33, or diffraction-grating 16, a reflection mirror 34 and an emitting slit 35, there are provided with a calibration light source 36 having a known wavelength component, a half-mirror 37, a lens 38 and an auxiliary detector 39. The position of the auxiliary detector 39 is selected such that, with the diffraction-grating 16 being at a predetermined angular position, the known wavelength component of the calibration light source 36 is detected by the auxiliary detector 39. The auxiliary detector produces a calibrating signal when it detects the known wavelength component of the calibration light source 36, and the calibrating signal is applied to the terminal LOAD of the wavelength counter 60, while the count setting unit 70 is preset to a value corresponding to the tuning wavelength of the monochromator to be obtained when the diffraction-grating is at the predetermined angular position, whereby the count of the wavelength counter is correctly calibrated.

In comparison with the prior art apparatus using a wavelength generator as previously mentioned in which the wavelength calibration is carried out by measuring the deviation of the indication of the tuning wavelength from the actual tuning wavelength and by adding to or subtracting from the indication the value corresponding to the deviation through a complicated electrical arithmetic unit, or by troublesome mechanical readjustment of the fitting of the diffraction-grating, the present invention provides an apparatus in which the wavelength calibration is carried out merely by setting the wavelength counter 60 to a fixed value so that manual and automatic wavelength calibrations are accomplished with great ease.

As will be described hereinafter, the invention is applicable to a monochromator with interchangeable diffraction-gratings. In a monochromator of the type wherein a diffraction-grating is rotated through a sine bar, the tuning wavelength $\lambda$ of the monochromator is given by $$\lambda = k \cdot d \cdot x \quad (1),$$

where d represents a grating constant of the diffraction gratings, x the travel of the slider 13 and k a constant determinable by the length of the lever 14 and the like factors. Assuming that two diffraction-gratings A and B having grating constants of $d_A$ and $d_B$ respectively are interchanged, the tuning wavelength $\lambda$ of the monochromator with the diffraction-grating A holds from equation (1), $$\lambda = k \cdot d_A \cdot x \quad (2),$$

and with the diffraction-grating B, it holds $$\lambda = k \cdot d_B \cdot x \quad (3).$$

If the diffraction-gratings are interchanged at $x = x_o$ and $d_A \neq d_B$, the tuning wavelength $\lambda_A$ with the diffraction-grating A represented by $\lambda_A = k \cdot d_A \cdot x_o$ is not equal to the tuning wavelength $\lambda_B$ with the diffraction-grating B represented by $\lambda_B = k \cdot d_B \cdot x_o$. Consequently, the tuning wavelength is different at $x = x_o$ between before and after the interchange of diffraction-gratings, resulting in great inconvenience. Then, in the prior art apparatus, the monochromator is arranged such that the tuning wavelength $\lambda$ with the diffraction-grating A is given by the equation (2), while the tuning wavelength $\lambda$ with the diffraction-grating B is given as follows:

$$\lambda = k \cdot d_B \cdot x + k \cdot x_o (d_A - d_B) \quad (4)$$

whereby the tuning wavelengths at $x = x_o$ before and after the interchange are made equal. This is realized by, for example, changing the angle between the diffraction-grating 16 and the lever 14 as well as the angle between the slider 13 and the lever 14 by a suitable amount when the diffraction-grating A is interchanged by the diffraction-grating B. On the other hand, since the output of the wavelength signal generator is proportional to the travel x of the slider, the tuning wavelength of the monochromator can not be determined by the output of the wavelength signal generator unless it is readjusted to give an output indicative of equation (4) in place of equation (2) when the diffraction-grating A is interchanged by the diffraction-grating B. This readjustment must be done to multiply the output signal of the wavelength signal generator by a constant and to add to the multiplied result another constant. An electrical operation to perform such calculations is very complicated. Further, where diffraction-gratings of different gratings constants are interchanged depending on the desired wavelength region, it is impossible to change the indication of a mechanical count indicator which is mechanically linked with the dispersion element driver unit, resulting in a requirement for incorporating two count indicators, one for the diffraction-grating A and the other for the diffraction-grating B.

Figure 8:
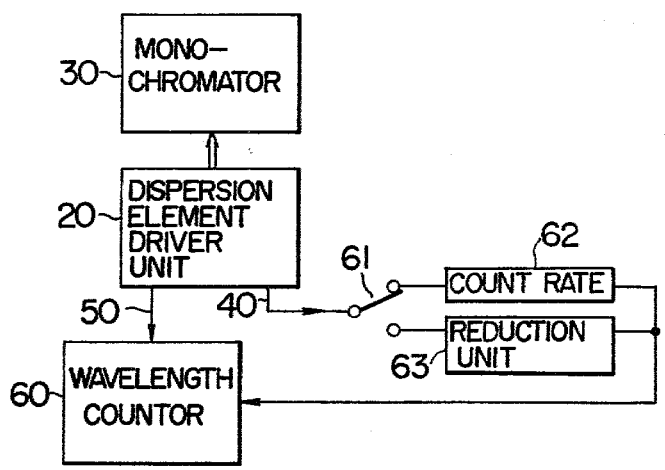
FIG. 8 is a block diagram schematically showing another embodiment of the invention.

In accordance with the invention, the necessary adjustment for the diffraction-grating interchange is easily carried out with an arrangement as shown in FIG. 8. As will be seen from FIG. 8, the wavelength counting pulse signal from the dispersion element driver unit 20 is applied through a change-over switch 61 selectively to either one of count rate reduction units 62 and 63 which have different reduction rates and are commonly connected to the wavelength counter 60. The pulse counts are capable of being reduced at different ratios at the respective count rate reduction units which may be a kind of frequency divider. In the case of interchange of diffraction-gratings at a wavelength $\lambda_o$, for example, the change-over switch 61 is switched over in accordance with the interchange of the diffraction-gratings. Since reduction ratios of the count rate reduction units 62 and 63 are selected to have values corresponding to the grating constants $d_A$ and $d_B$ of the diffraction-gratings to be interchangeably used, the count of the wavelength counter 60 gives in any event the correct tuning wavelength, thereby eliminating such troublesome calculation as otherwise would be required for determining the true tuning wavelength from the output of the counter in case of the interchange of diffraction-gratings.

As has been described with reference to FIG. 3, the wavelength counter 60 used for the foregoing embodiments may be realized as a digital counter. However, most digital counters generally have count indications of a volatile memory type which disappear in the event of power interruption. Even with a digital counter of a non-volatile memory type, if the scanning operation of the monochromator as to wavelengths were carried out manually during power interruption, the wavelength counter count not properly operate and would give an erroneous count. Accordingly, after the recovery of power, it is possible for the wavelength counter 60 to indicate an erroneous count which does not correspond to the tuning wavelength λ of the monochromator until the calibration is carried out in response to the wavelength calibrating pulse signal 50. Thus, it is desirable that before the monochromator 30 is used for measurement, the monochromator 30 is automatically subjected to a scanning operation toward the calibrating wavelength $\lambda_c$ after the recovery of power thereby effecting the calibration of the wavelength counter with application of the wavelength calibrating pulse signal 50. However, it is difficult to automatically detect whether the monochromator is conditioned at the time of the recovery of power to provide a tuning wavelength longer or shorter than the calibrating wavelength $\lambda_c$. Therefore, the automatic scanning of the monochromator following the recovery of power has difficulties in determination of its scanning direction. To solve this problem, the wavelength calibrating pulse signal is preferably produced at one of two wavelengths $\lambda_S$ and $\lambda_L$ assuming that the wavelength range of the monochromator extends from $\lambda_S$ to $\lambda_L$ ($\lambda_S < \lambda_L$). With the calibrating wavelength $\lambda_c$ made equal to $\lambda_S$, by scanning the monochromator automatically towards the shortest wavelength $\lambda_S$ after the recovery of power, the wavelength calibrating pulse signal can be produced without fail. Obviously, if $\lambda_c = \lambda_L$, the monochromator should be scanned automatically towards the longest wavelengths $\lambda_L$. Further, it is not necessarily required to select $\lambda_c = \lambda_S$ or $\lambda_c = \lambda_L$ and it is also possible to set such that the calibrating signal is produced with the slider being located at a specific point which corresponds to a tuning wavelength $\lambda_c$ shorter than $\lambda_S$ or longer than $\lambda_L$ and calibrate the count of the wavelength counter to meet the value corresponding to $\lambda_c$.

Figure 9:
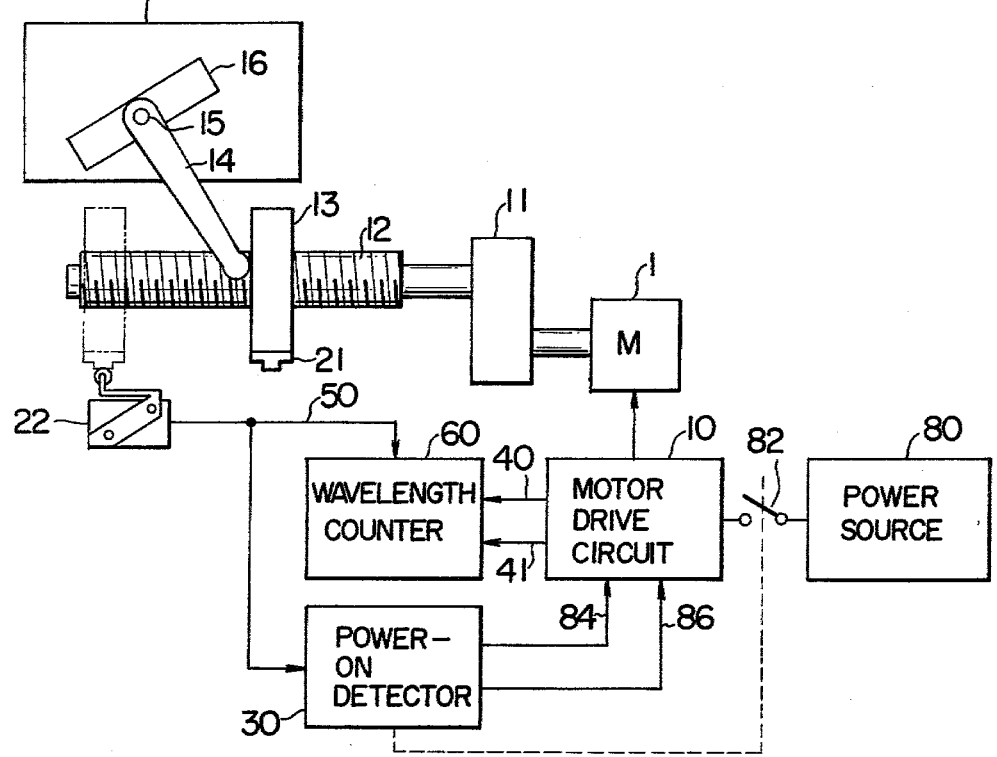
FIG. 9 is a diagram schematically showing still another embodiment of the invention incorporated with an automatic calibration unit.

Turning now to FIG. 9, there is shown a circuit diagram of a wavelength reading apparatus incorporated with an automatic calibrating unit according to the invention. In FIG. 9, like elements and units are represented by the same reference numerals as FIG. 2. The wavelength scanning operation of the monochromator 30 is carried out by rotating the diffraction-grating 16. The wavelength scanning range of the monochromator extends from a position at which the slider 13 reaches the righthand extreme end on the operative path of the feed screw 12 (where the tuning wavelength λ is $\lambda_S$) to a position at which the slider 13 travels the lefthand extreme end as shown by chained lines in FIG. 9 (where $\lambda = \lambda_L$). As the slider 13 travels to the left, the tuning wavelength of the monochromator becomes longer. The slider 13 is mounted with the pawl 21 which actuates the switch 22 when the tuning wavelength λ is $\lambda_L$. An actuation signal of the switch 22 acting as the wavelength calibrating pulse 50 is transmitted to the wavelength counter 60 to set the count thereof to a value corresponding to the wavelength $\lambda_L$. With the above arrangement, when a power source 80 is fed by, for example, throwing a switch 82, a source-on detector 83 produces a direction signal 84 which in turn is applied to the motor drive circuit 10. The signal 84 causes the motor drive circuit 10 to drive the motor 1 in a predetermined direction which is the direction, in this example, to move the slider 13 to the left. As a result, the slider 13 is caused to travel to the left until it reaches the position designated at chained lines at which $\lambda = \lambda_L$. Then, the wavelength calibrating signal 50 produced from the switch 22 is applied to the wavelength counter 60 to set the count of the same at a value corresponding to $\lambda_L$ and concurrently applied to the power-on detector 83 to reset the same. When reset, the power-on detector 83 applies a motor-stop signal 86 to the motor drive circuit 10 which in turn causes the motor 1 to stop, resulting in stoppage of the scanning motion of the monochromator. In this manner, the count of the wavelength counter 60 is automatically calibrated after power is tuned on. Thereafter, in the course of the usual operation of wavelength scanning motion, the wavelength counter is capable of indicating a count in compliance with the tuning wavelength of the monochromator.

Figure 10:
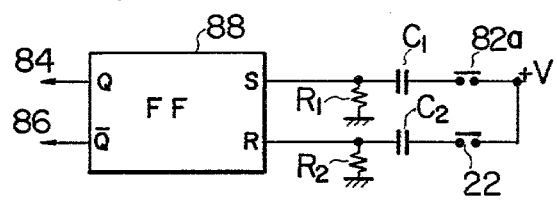
FIG. 10 is an example of the power-on circuit of FIG. 9.

FIG. 10 shows an example of the power-on circuit 30. When the power switch 82 is turned on, a normally-opened switch 82a is also closed and a dc voltage +V is applied through a differentiating circuit including a capacitor $C_1$ and a resistor $R_1$ to the set terminal of a flip-flop 88, which in turn produces at its terminal Q an output pulse to be used as the signal 84. When the switch 22 is turned on, the dc voltage +V is applied through another differential circuit including a capacitor $C_1$ and a resistor $R_1$ to the reset terminal of the flip-flop 88, which in turn produces at its terminal $\overline{Q}$ an output pulse to be used as the signal 86.

As will be understood from the foregoing description, the present invention achieves excellent technical advantages as listed below.

(1) The value representing the tuning wavelength of the monochromator is composed electrically, resulting in eliminating mechanical limitations on the location of the wavelength indicator relative to the dispersion element driver unit;

(2) Interchange of the light sources, detectors, diffraction-gratings and filters according to change of the wavelength range of the monochromator can easily be automated;

(3) The apparatus can be incorporated satisfactorily with a relatively high speed scanning operation of the monochromator;

(4) Accuracy in wavelength reading can easily be improved;

(5) The wavelength counter is realized at a greatly lower cost than using digital encoders;

(6) With a monochromator wherein diffraction-gratings of different grating constants are interchangeably used depending on the desired wavelength range, no troublesome calculation of the value of the tuning wavelength is required and the indication of the wavelength can be readily achieved; and (7) An easy manual and automatic wavelength calibration for the monochromator can be ensured.

We claim:

1. A wavelength reading apparatus for an optical instrument comprising:
   an optical system having a dispersion element rotatably mounted with its tuning wavelength varying in accordance with the variation of its angular position in rotation;

a driver unit for rotating said dispersion element through a predetermined angular range;

a wavelength counting pulse generator for producing wavelength counting pulses, at least one counting pulse being produced with every variation of the angular position of said dispersion element corresponding to a predetermined increment in variation of the tuning wavelength of said dispersion element;

a counter for adding to or subtracting from a set value the number of said wavelength counting pulses depending on the rotational direction of said dispersion element;

means for producing a calibrating pulse in response to a predetermined angular position of said dispersion element in said predetermined angular range, comprising a member movable in accordance with the rotation of said dispersion element, and a switch disposed in the moving path of said member for producing an electrical signal when the dispersion element is located at said predetermined angular position; and means for setting said counter to said set value in response to said calibrating pulse, said set value corresponding to the tuning wavelength of said dispersion element when it is positioned at said predetermined angular position.

2. A wavelength reading apparatus according to claim 1, wherein said wavelength counting pulse generator comprises a disc linked with said driver unit so as to be rotated in synchronism with rotation of said dispersion unit, said disc having a plurality of slits formed therein along its periphery with a predetermined space therebetween corresponding to said predetermined increment in variation of the tuning wavelength of said dispersion element, a light source disposed on one side of said disc, and a photoelectric element disposed on the other side of said disc, said slits, said light source and photoelectric element being arranged to allow a light beam from said light source to be projected onto said photoelectric element successively through said slits when said disc rotates.

3. A wavelength reading apparatus according to claim 1, wherein said driver unit comprises a pulse motor for rotating the dispersion element and wherein said wavelength counting pulse generator comprises a driving pulse generator for producing driving pulses which are employed for driving said pulse motor, said driving pulses being used as the wavelength counting pulses.

4. A wavelength reading apparatus according to claim 1, wherein said calibrating pulse producing means comprises a slider member movable along a feed screw to cause the rotation of said dispersion element, and a switch disposed in the moving path of said slider member for engagement with the slider member thereby to produce an electrical signal when said dispersion element is located at a predetermined angular position.

5. A wavelength reading apparatus according to claim 4, wherein said calibrating pulse producing means further comprises a disc linked with said driver unit so as to be rotated in synchronism with rotation of said dispersion unit, said disc having a single slit formed therein, a light source disposed on one side of said disc and normally unenergized, a photoelectric element disposed on the other side of said disc so that the light of said light source is capable of projecting onto said photoelectric element through said slit once in each revolution of said disc and means for energizing said light source by the actuation of said switch.

6. A wavelength reading apparatus according to claim 1, further comprising a first pulse rate reduction unit receiving an input pulse signal to produce an output pulse signal having a pulse rate reduced from that of the input pulse signal at a first predetermined reduction ratio, a second pulse rate reduction unit receiving an input pulse signal to produce an output pulse signal having a pulse rate reduced from that of the input pulse at a second predetermined reduction ratio different from said first reduction ratio, and means for applying the pulses produced by said wavelength counting pulse generator to said counter selectively through the first or second pulse rate reduction unit.

7. A wavelength reading apparatus according to claim 1, wherein said calibrating pulse generator is arranged to produce the calibrating pulse at one extreme end position in the range for rotation of said dispersion element, and said driver unit comprises means for driving said dispersion element automatically to said one extreme end position when the apparatus is reenergized.

8. A wavelength reading apparatus according to claim 4, wherein said calibrating pulse generator is arranged to produce the calibrating pulse when said slider member is at one extreme end position of the feed screw corresponding to an extreme end position in the range for rotation of said dispersion element, and said driver unit comprises means for driving said slider member automatically to said extreme end position when the apparatus is reenergized.

9. A wavelength reading apparatus according to claim 1, wherein the optical system comprises:

an entrance slit;

a dispersion element rotatably mounted for dispersing incident rays from said entrance slit to form plural wavelength lights, and an exit slit positioned adjacent to an imaging point of a particular wavelength light of said plural wavelength lights, wherein a tuning wavelength emitted from the exit slit varies in accordance with the variation in the angular position of rotation of the dispersion element.

10. A wavelength reading apparatus according to claim 9, wherein the optical system further comprises a bar having one end thereof coupled to the dispersion element and another end thereof coupled to the driver unit for rotating said dispersion element.

11. A wavelength reading apparatus for an optical instrument comprising:

an optical system having a dispersion element rotatably mounted with its tuning wavelength varying in accordance with the variation of its angular position in rotation;

a driver unit for rotating said dispersion element through a predetermined angular range;

a wavelength counting pulse generator for producing wavelength counting pulses, at least one counting pulse being produced with every variation of the angular position of said dispersion element corresponding to a predetermined increment in variation of the tuning wavelength of said dispersion element;

a counter for adding to or subtracting from a set value the number of said wavelength counting pulses depending on the rotational direction of said dispersion element;

means for producing a calibrating pulse in response to a predetermined angular position of said dispersion element in said predetermined angular range, which comprises a switch means for producing a calibrating pulse, and a moving member for acting on said switching means at a predetermined position is moving through a predetermined move range, said predetermined position corresponding to a calibration tuning wavelength;

means for holding a set value corresponding to the calibration tuning wavelength of said dispersion element when it is positioned at said predetermined angular position; and means for setting said counter to said set value in said holding means in response to said calibrating pulse.

* * * * *